(12) United States Patent
Kawate et al.

(10) Patent No.: US 7,898,781 B2
(45) Date of Patent: Mar. 1, 2011

(54) ARC FAULT DETECTION APPARATUS EMPLOYING A COMPARATOR WITH A CONTINUOUSLY VARIABLE THRESHOLD

(75) Inventors: Keith W. Kawate, Attleboro Falls, MA (US); Lynwald Edmunds, South Easton, MA (US); Roger D. Mayer, Rehoboth, MA (US)

(73) Assignee: Sensata Technologies Massachusetts, Inc., Attleboro, MA (US)

( * ) Notice: Subject to any disclaimer, the term of this patent is extended or adjusted under 35 U.S.C. 154(b) by 435 days.

(21) Appl. No.: 12/184,297

(22) Filed: Aug. 1, 2008

(65) Prior Publication Data

US 2010/0027176 A1    Feb. 4, 2010

(51) Int. Cl.
*H02H 3/05* (2006.01)
*H02H 3/08* (2006.01)
*H02H 3/38* (2006.01)

(52) U.S. Cl. .................................. 361/79; 361/93.1
(58) Field of Classification Search .................. 361/43, 361/93.1
See application file for complete search history.

(56) References Cited

U.S. PATENT DOCUMENTS 7,190,561 B2    3/2007    Pellon et al.
7,190,562 B2    3/2007    Pellon et al.

*Primary Examiner*—Evan Pert
(74) *Attorney, Agent, or Firm*—Russell E. Baumann

(57) ABSTRACT

An arc fault detection apparatus that provides for better discrimination of electrical arcing events from nuisance loads. The arc fault detection apparatus includes an arcing sense circuit having a comparator circuit with a variable threshold voltage that varies continuously with the line voltage. The arc fault detection apparatus has reduced susceptibility to nuisance tripping in the presence of sudden changes in the load current that occur outside of a specified time window centered on each zero crossing point of the line voltage.

17 Claims, 9 Drawing Sheets

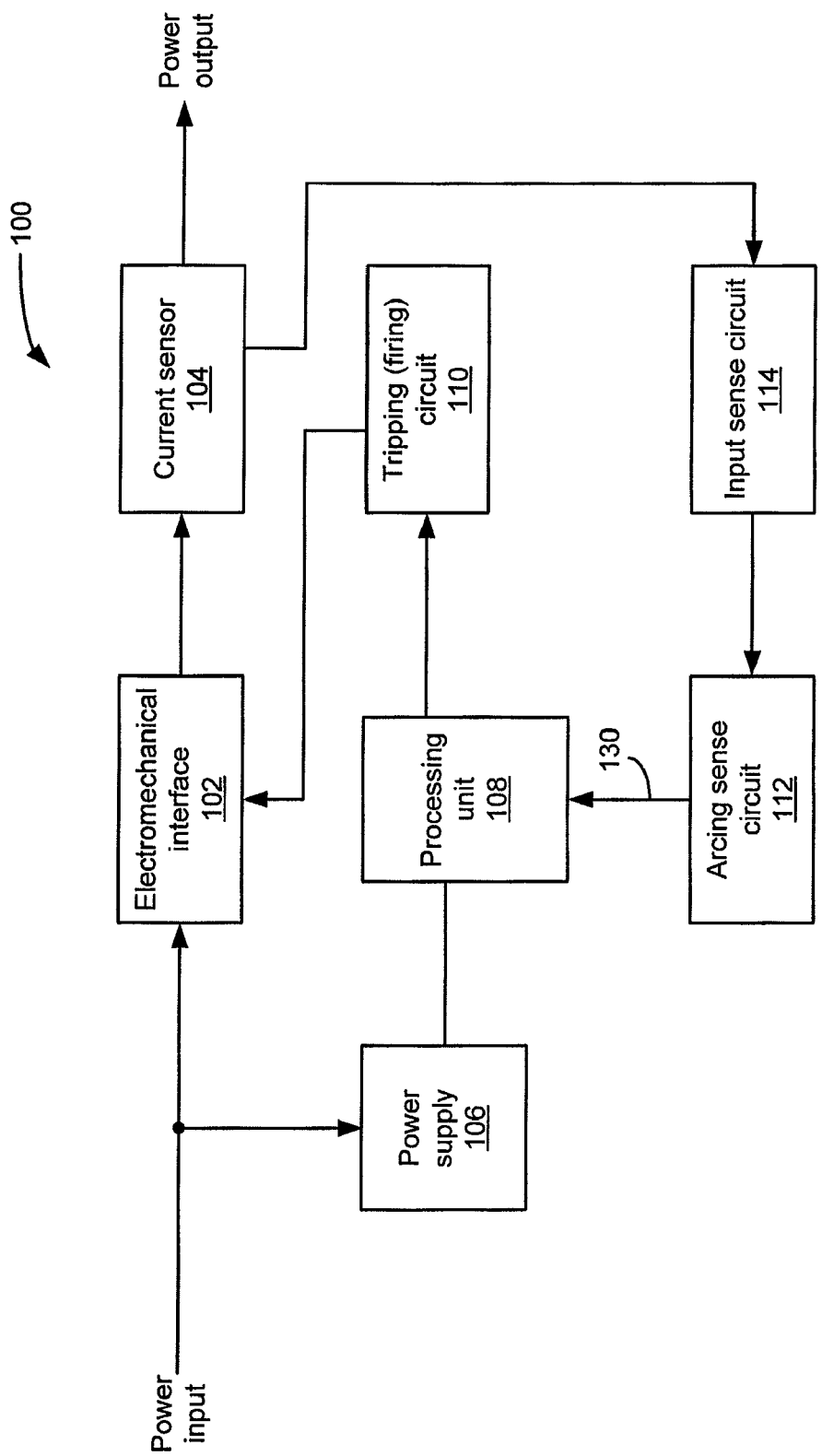
*Fig. 1a – Prior art*

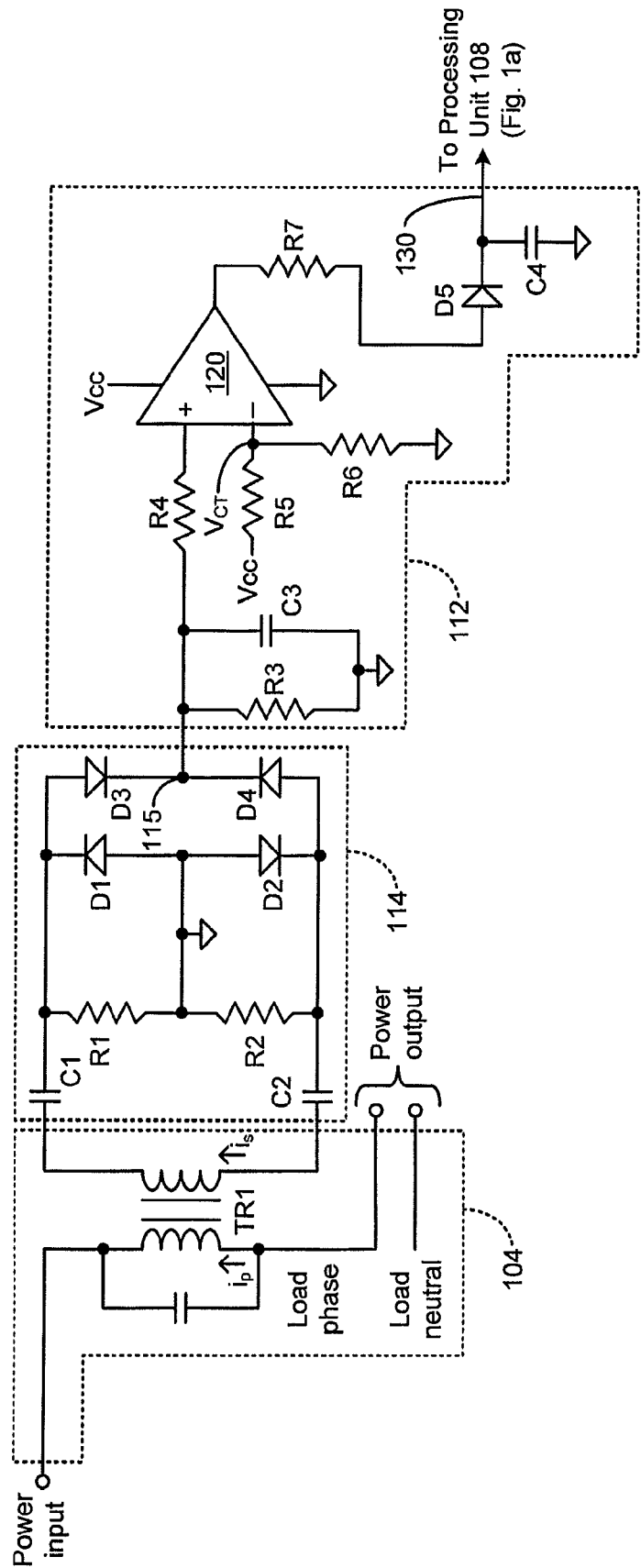
Fig. 1b – Prior art

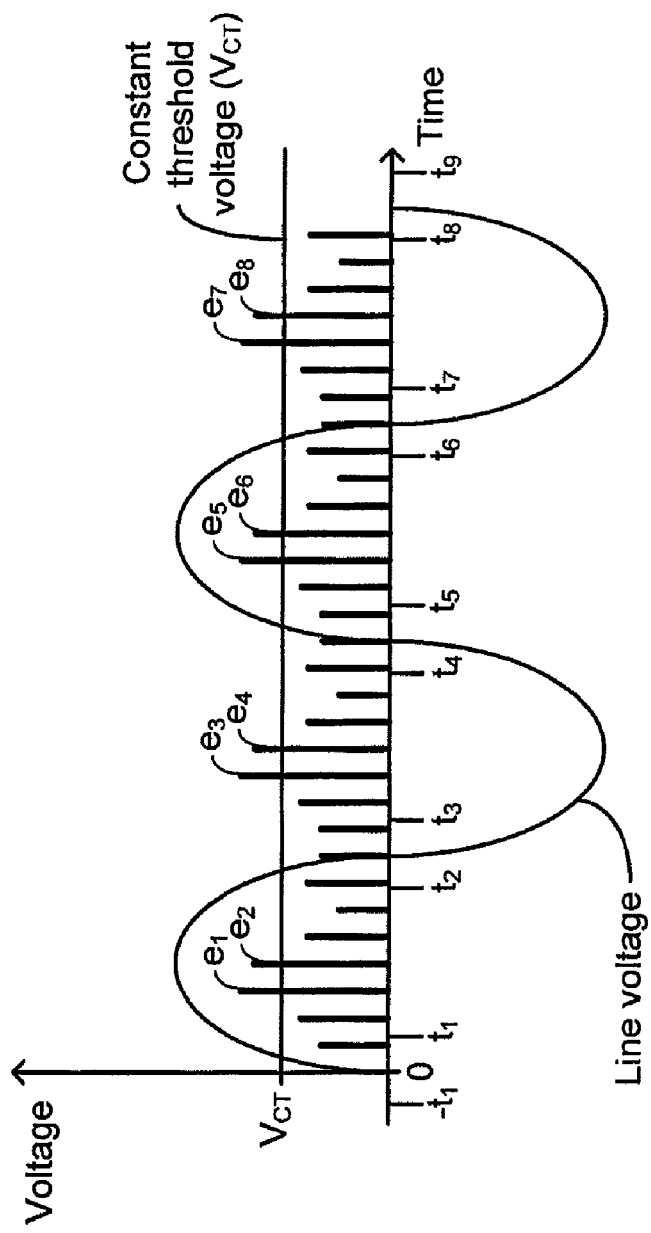
Fig. 1c – Prior art

ARC FAULT DETECTION APPARATUS EMPLOYING A COMPARATOR WITH A CONTINUOUSLY VARIABLE THRESHOLD

CROSS REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

The present invention relates generally to arc fault detection apparatus and methods, and more specifically to an arc fault detection apparatus and method that provides for better discrimination of electrical arcing events from nuisance loads by employing a comparator circuit with a variable threshold voltage that varies continuously with the input line voltage.

Arc fault detection apparatus are known that may be employed to provide discrimination between electrical arcing events and nuisance loads. For example, an arc fault detection apparatus may include a current sensor, an input sense circuit, an arcing sense circuit, a power supply, a tripping (firing) circuit, a processing unit, and an electromechanical interface. In a typical mode of operation, the current sensor monitors the power input via the electromechanical interface, and provides high frequency components of the power input to the input sense circuit. The input sense circuit then filters and rectifies the AC signal at its input, and provides this sensed signal to the arcing sense circuit, which, in turn, provides voltage levels indicative of possible electrical arcing to the processing unit. Next, the processing unit measures the voltage levels and analyzes the voltage measurements using one or more algorithms to determine whether the voltage levels resulted from an arc fault or a nuisance load. In the event the detected levels resulted from an arc fault, the processing unit activates the firing circuit, thereby tripping the electromechanical interface to disconnect the power input from the power output. By making a determination as to whether the AC signal sensed by the input sense circuit resulted from an electrical arc fault or a nuisance load before tripping the electromechanical interface, the susceptibility of the arc fault detection apparatus to nuisance tripping is reduced.

In a typical embodiment of the above-described arc fault detection apparatus, the arcing sense circuit includes a comparator circuit with a constant threshold voltage. The input sense circuit provides the filtered and rectified AC signal at its output to this comparator circuit, which operates to compare the level of this sensed signal with the level of the constant threshold voltage. When a significant change in the load current occurs (i.e., when a significant "di/dt event" occurs), the level of the sensed signal may exceed the constant threshold voltage level, causing the output of the comparator circuit to be driven to its rail. The comparator circuit then provides one or more voltage levels to the processing unit, which measures the voltage levels and analyzes the voltage measurements to determine whether the detected di/dt event(s) resulted from an arc fault or a nuisance load.

Although the arc fault detection apparatus described above has been successfully employed in many different applications for detecting electrical arcing, there is a need for an arc fault detection apparatus that provides for better discrimination of electrical arcing events from nuisance loads. For example, the creation and cessation of electrical arcs can cause sudden changes in the load current (i.e., sudden di/dt events) to occur near the zero crossing points of the input line voltage, typically within a specified time window centered on the zero crossing points. The Applicants have recognized, however, that nuisance loads can cause sudden di/dt events to occur both within and outside of these specified time windows. The Applicants have also recognized that some types of nuisance loads can cause a greater number of sudden di/dt events to occur outside of these specified time windows than within these time windows.

Because the arc fault detection apparatus described above employs a comparator circuit with a constant threshold voltage within its arcing sense circuit, the comparator circuit compares voltage levels corresponding to sudden di/dt events with the same constant threshold voltage level, whether or not these di/dt events occurred within or outside of the specified time windows centered on the line voltage zero crossing points. Moreover, because the levels of sudden di/dt events resulting from nuisance loads that occur outside of these specified time windows can exceed the level of the constant threshold voltage, the above-described arc fault detection apparatus may incorrectly characterize such sudden di/dt events as arc faults, thereby resulting in nuisance tripping.

It would therefore be desirable to have improved arc fault detection apparatus and methods that avoid the drawbacks of the above-described arc fault detection apparatus.

BRIEF SUMMARY OF THE INVENTION

In accordance with the present invention, an arc fault detection apparatus is disclosed that provides for better discrimination of electrical arcing events from nuisance loads. The presently disclosed arc fault detection apparatus achieves such improved arc fault discrimination by employing a comparator circuit with a variable threshold voltage that varies continuously with the input line voltage.

In one embodiment, the presently disclosed arc fault detection apparatus includes a current sensor, an input sense circuit, an arcing sense circuit, a power supply, a tripping (firing) circuit, a processing unit, and an electromechanical interface. In one mode of operation, the current sensor monitors the power input via the electromechanical interface, and provides high frequency components of the power input to the input sense circuit. The input sense circuit then filters and rectifies the AC signal at its input, and provides this sensed signal to the arcing sense circuit, which, in turn, provides voltage levels indicative of possible electrical arcing to the processing unit. Next, the processing unit measures the voltage levels and analyzes the voltage measurements using one or more algorithms to determine whether the voltage levels resulted from an arc fault or a nuisance load. In the event the detected levels resulted from an arc fault, the processing unit activates the firing circuit, thereby tripping the electromechanical interface to disconnect the power input from the power output.

In the presently disclosed embodiment, the arcing sense circuit includes a comparator circuit with a variable threshold voltage that varies continuously with the input line voltage. In one embodiment, the variable threshold voltage varies in-phase with a rectified version of the line voltage, and varies continuously within a specified voltage range. The comparator circuit receives the filtered and rectified AC signal generated by the input sense circuit, and compares the level of this sensed signal with the level of the continuously variable threshold voltage. In one embodiment, the variable threshold voltage varies continuously from a first voltage level at approximately the midpoint of a specified time window centered on each zero crossing point of the periodic line voltage to a higher second voltage level at each end of the specified time window, and varies continuously from the second voltage level at each end of the specified time window to a still higher third voltage level at approximately the midpoint between successive time windows.

If the level of the sensed signal provided by the input sense circuit corresponds to a sudden change in the load current (i.e., a sudden "di/dt event") that occurs within the specified time window centered on a zero crossing point of the line voltage, then the comparator circuit compares the level of this sensed signal with the level of the variable threshold voltage which varies continuously from the first voltage level at about the midpoint of the specified time window to the higher second voltage level at the ends of the specified time window. Alternatively, if the level of the sensed signal corresponds to a sudden di/dt event that occurs outside of the respective time windows centered on the line voltage zero crossing points, then the comparator circuit compares the level of this sensed signal with the level of the variable threshold voltage which varies continuously from the second voltage level at each end of a respective time window to the still higher third voltage level at about the midpoint between successive time windows.

Arc faults generally cause sudden di/dt events to occur within one or more of the above-described time windows centered on the zero crossing points of the line voltage, while some types of nuisance loads can cause increased numbers of sudden di/dt events to occur outside of these time windows. By employing the comparator circuit with the variable threshold voltage that varies continuously with the line voltage from a first voltage level to a higher second voltage level within these time windows, and that varies continuously with the line voltage from the second voltage level to a still higher third voltage level outside of these time windows, the susceptibility of the disclosed arc fault detection apparatus to nuisance tripping is reduced.

Other features, functions, and aspects of the invention will be evident from the Detailed Description of the Invention that follows.

BRIEF DESCRIPTION OF THE SEVERAL VIEWS OF THE DRAWINGS

The invention will be more fully understood with reference to the following Detailed Description of the Invention in conjunction with the drawings of which:

FIG. 1a is a block diagram of a prior embodiment of an arc fault detection apparatus;

FIG. 1b is a schematic diagram illustrating a current sensor, an input sense circuit, and an arcing sense circuit included in the arc fault detection apparatus of FIG. 1a, in which the arcing sense circuit includes a comparator circuit with a constant threshold voltage;

FIG. 1c is a timing diagram illustrating the relationship between the constant threshold voltage employed by the comparator circuit of FIG. 1b, the input line voltage, and a number of sudden di/dt events caused by a nuisance load;

FIG. 2c is a schematic diagram illustrating a power supply and a reference voltage generator included in the arc fault detection apparatus of FIG. 2a;

FIG. 3 is a flow diagram illustrating a method of operating the arc fault detection apparatus of FIG. 2a.

DETAILED DESCRIPTION OF THE INVENTION

Figure 2A:
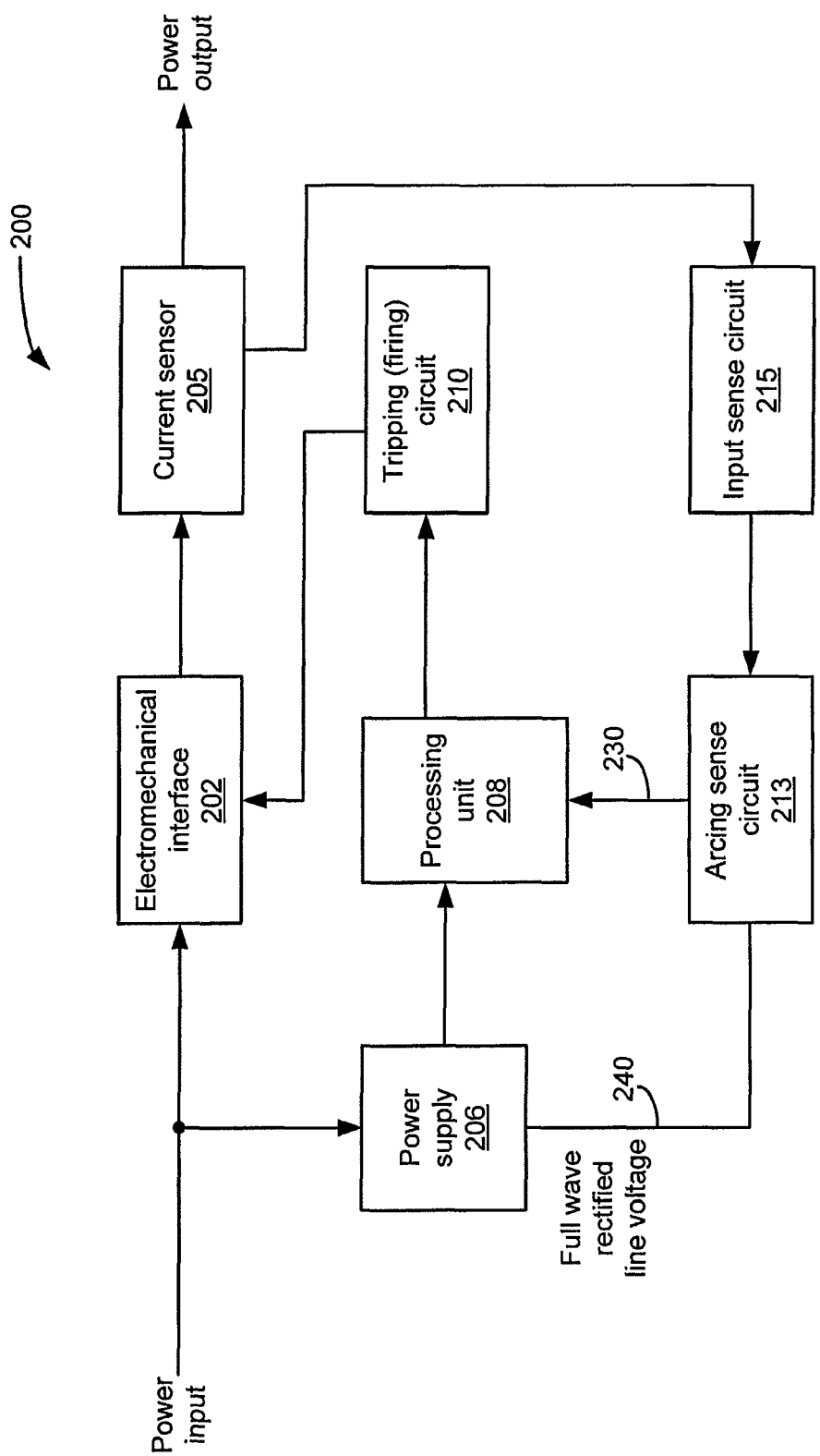
FIG. 2a is a block diagram of an arc fault detection apparatus according to the present invention.

An arc fault detection apparatus is disclosed that provides for better discrimination of electrical arcing events from nuisance loads. The presently disclosed arc fault detection apparatus includes an arcing sense circuit having a comparator circuit with a variable threshold voltage that varies continuously with the input line voltage. The disclosed arc fault detection apparatus has reduced susceptibility to nuisance tripping in the presence of sudden changes in the load current occurring outside of a specified time window centered on each zero crossing point of the line voltage.

FIG. 1 depicts a prior embodiment 100 of an arc fault detection apparatus. For example, the arc fault detection apparatus 100 is like the apparatus described in U.S. Pat. No. 7,190,561 issued Mar. 13, 2007 entitled APPARATUS FOR DETECTING ARC FAULTS, which is assigned to and commonly owned by the same assignee as the present invention, and which is hereby incorporated herein by reference in its entirety. As shown in FIG. 1a, the arc fault detection apparatus 100 comprises a current sensor 104, an input sense circuit 114, an arcing sense circuit 112, a power supply 106, a tripping (firing) circuit 110, a processing unit 108, and an electromechanical interface 102. In a typical mode of operation, the current sensor 104 monitors the power input via the electromechanical interface 102, and provides high frequency components of the power input to the input sense circuit 114. Next, the input sense circuit 114 filters and rectifies the AC signal at its input, and provides this sensed signal to the arcing sense circuit 112. The arcing sense circuit 112 then provides voltage levels indicative of possible electrical arcing to the processing unit 108 over a line 130. Next, the processing unit 108 measures the voltage levels and analyzes the voltage measurements using one or more algorithms to determine whether the voltage levels resulted from an arc fault or a nuisance load. In the event it is determined that the detected levels resulted from an arc fault, the processing unit 108 activates the firing circuit 110, thereby tripping the electromechanical interface 102 to disconnect the power input from the power output.

FIG. 1b depicts typical implementations of the current sensor 104, the input sense circuit 114, and the arcing sense circuit 112 included in the arc fault detection apparatus 100. As shown in FIG. 1b, the current sensor 104 includes a transformer TR1, which monitors the power input by monitoring an alternating current (AC) i flowing through a load coupleable to the power output via a load line phase terminal and a load line neutral terminal. The transformer TR1 is operative to magnetically couple the high frequency components of the AC current $i_p$ from its primary coil to its secondary coil, thereby providing an AC current $i_s$ to the input sense circuit 114.

The input sense circuit 114 includes capacitors C1-C2, resistors R1-R2, and diodes D1-D4. As shown in FIG. 1b, the secondary coil of the transformer TR1 is connected between the two capacitors C1-C2. The resistors R1-R2 are connected in series across the capacitors C1-C2 and the transformer secondary coil, and the common node connection of the resistors R1-R2 is connected to ground. The capacitors C1-C2 are operative to perform high pass filtering of the AC signal provided by the transformer secondary coil, and the resistors R1-R2 provide a ground reference for the secondary coil. The cathode of the diode D1 is connected to the common node connection of the capacitor C1, the resistor R1, and the anode of the diode D3. Similarly, the cathode of the diode D2 is connected to the common node connection of the capacitor C2, the resistor R2, and the anode of the diode D4. The cathodes of the diodes D3-D4 are connected to a node 115 that provides the output of the input sense circuit 114 to the arcing sense circuit 112. The diodes D1-D4 are configured to form a full wave rectified bridge, and therefore the output provided at the node 115 is a full wave rectified signal.

The arcing sense circuit 112 includes resistors R3-R7, capacitors C3-C4, a diode D5, and a comparator 120. As shown in FIG. 1b, the resistor R3 and the capacitor C3 are connected between the node 115 and ground, and the resistor R4 is connected between the node 115 and the non-inverting input of the comparator 120. The resistors R5-R6 are configured to form a voltage divider that provides a constant threshold voltage ($V_{CT}$) to the inverting input of the comparator 120. When the voltage level of the signal provided at the node 115 exceeds the level of the constant threshold voltage ($V_{CT}$) at the inverting input of the comparator 120, the comparator 120 charges the capacitor C4 through the diode D5 and the resistor R7. The diode D5 is operative to prevent reverse current flow from the capacitor C4. The comparator 120 continues to charge the capacitor C4 so long as the voltage level at the non-inverting input of the comparator 120 remains greater than the constant threshold voltage ($V_{CT}$), which in this prior embodiment is equal to $V_{CC}*R6/(R5+R6)$.

Accordingly, each time a significant change in the load current (i.e., a significant "di/dt event") is detected at the non-inverting input of the comparator 120, the output of the comparator 120 is driven to its positive rail, thereby generating a pulse for charging the capacitor C4 through the diode D5 and the resistor R7. The common node connection of the diode D5 and the capacitor C4 is connected to an input of the processing unit 108 (see FIG. 1a), which is operative to take measurements of the voltage level across the capacitor C4, and to analyze the voltage measurements using one or more algorithms to determine whether the detected levels resulted from an arc fault or a nuisance load. In the event it is determined that the detected levels resulted from an arc fault, the processing unit 108 activates the firing circuit 110 (see FIG. 1a) to trip the electromechanical interface 102 and disconnect the power input from the power output.

FIG. 1c is a timing diagram depicting the relationship between the constant threshold voltage ($V_{CT}$) employed by the comparator 120, the input line voltage, and a number of sudden di/dt events such as events $e_1$-$e_8$, which may be caused by a nuisance load such as a vacuum cleaner. It is noted that the creation and cessation of electrical arcs can cause sudden di/dt events to occur near the zero crossing points of the periodic line voltage, typically within a specified time window centered on one or more of the zero crossing points. For example, electrical arc typically require a minimum voltage in the range of about 10 volts to 50 volts to sustain themselves, depending upon the corresponding arc current. Sudden changes in the line current associated with electrical arc creation and cessation therefore typically occur within about 1 msec of the zero crossing point of the line voltage, as illustrated by the equation below.

$$54 \text{ volts} = 115 Vrms * 2^{0.5} * \sin(2\pi * 60 \text{ Hz} * 1 \text{ msec})$$

It is noted that inductive and capacitive loads can broaden this +/−1 msec time window. It should be appreciated that a time window of any other suitable duration may be employed.

FIG. 1c depicts five such time windows ranging from $-t_1$ to $t_1$, from $t_2$ to $t_3$, from $t_4$ to $t_5$, from $t_6$ to $t_7$, and from $t_8$ to $t_9$. As shown in FIG. 1c, the voltage levels of the sudden di/dt events caused by the nuisance load and occurring within each of these time windows $-t_1$ to $t_1$, $t_2$ to $t_3$, $t_4$ to $t_5$, $t_6$ to $t_7$, and $t_8$ to $t_9$ are less than the level of the constant threshold voltage ($V_{CT}$), and therefore the levels of these sudden di/dt events are not high enough to cause the output of the comparator 120 to be driven to its rail. However, some of the voltage levels of the sudden di/dt events caused by the nuisance load that occur outside of these specified time windows, such as the levels of the events $e_1$-$e_8$ occurring between the respective time windows, exceed the level of the constant threshold voltage ($V_{CT}$). The levels of these events $e_1$-$e_8$ are therefore high enough to cause the output of the comparator 120 to be driven to its rail, thereby generating a pulse for charging the capacitor C4. Based on voltage measurements made across the capacitor C4, the processing unit 108 may incorrectly characterize the events $e_1$-$e_8$ caused by the nuisance load as arc faults, resulting in nuisance tripping.

FIG. 2a depicts an illustrative embodiment 200 of an arc fault detection apparatus, in accordance with the present invention. The arc fault detection apparatus 200 provides for better discrimination of electrical arcing events from nuisance loads by employing an arcing sense circuit including a comparator circuit with a variable threshold voltage that varies continuously with the line voltage. The arc fault detection apparatus 200 has reduced susceptibility to nuisance tripping in the presence of sudden changes in the load current that occur outside of a specified time window centered on each zero crossing point of the line voltage.

As shown in FIG. 2a, the arc fault detection apparatus 200 comprises a current sensor 205, an input sense circuit 215, an arcing sense circuit 213, a power supply 206, a tripping (firing) circuit 210, a processing unit 208, and an electromechanical interface 202. In one mode of operation, the current sensor 205 monitors the power input via the electromechanical interface 202, and provides high frequency components of the power input to the input sense circuit 215. Next, the input sense circuit 215 filters and rectifies the AC signal at its input, and provides this sensed signal to the arcing sense circuit 213. The arcing sense circuit 213 then provides voltage levels indicative of possible electrical arcing to the processing unit 208 over a line 230. For example, the processing unit 208 may be implemented using the MSP430F1122 micro-controller sold by Texas Instruments Inc., Dallas, Tex., USA, or any other suitable processor/controller. Next, the processing unit 208 measures the voltage levels and analyzes the voltage measurements using one or more algorithms to determine whether the voltage levels resulted from an arc fault or a nuisance load. In the event it is determined that the detected levels resulted from an arc fault, the processing unit 208 activates the firing circuit 210, thereby tripping the electromechanical interface 202 to disconnect the power input from the power output.

Figure 2B:
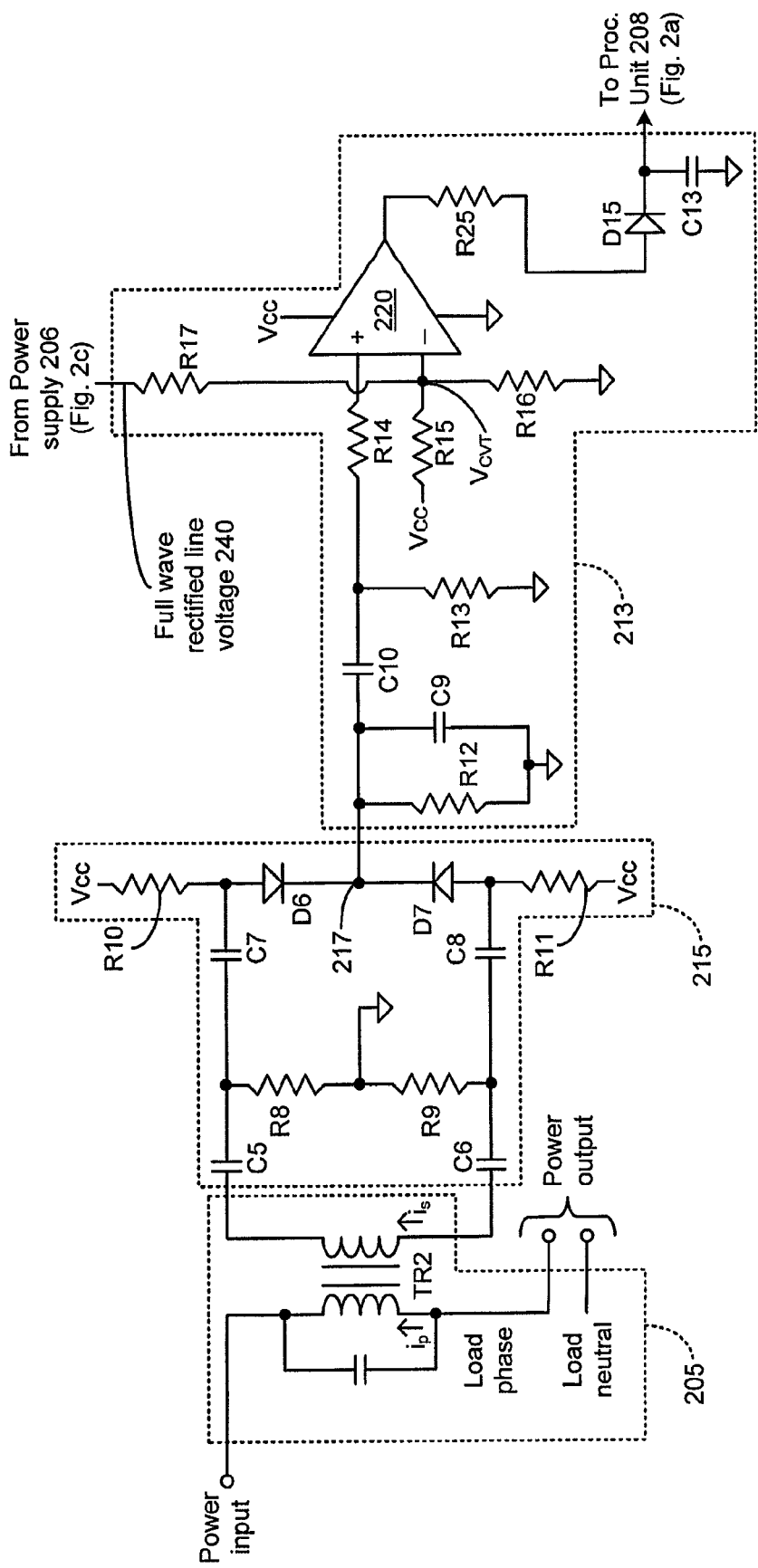
FIG. 2b is a schematic diagram illustrating a current sensor, an input sense circuit, and an arcing sense circuit included in the arc fault detection apparatus of FIG. 2a, in which the arcing sense circuit includes a comparator circuit with a variable threshold voltage.

FIG. 2b depicts illustrative embodiments of the current sensor 205, the input sense circuit 215, and the arcing sense circuit 213 included in the arc fault detection apparatus 200.

As shown in FIG. 2b, the current sensor 205 includes a transformer TR2, which monitors the power input by monitoring an alternating current (AC) i flowing through a load coupleable to the power output via a load line phase terminal and a load line neutral terminal. The transformer TR2 is operative to magnetically couple the high frequency components of the AC current $i_p$ from its primary coil to its secondary coil, thereby providing an AC current $i_s$ to the input sense circuit 215.

The input sense circuit 215 includes capacitors C5-C8, resistors R8-R11, and diodes D6-D7. As shown in FIG. 2b, the secondary coil of the transformer TR2 is connected between the two capacitors C5-C6. The resistors R8-R9 are connected in series across the capacitors C5-C6 and the transformer secondary coil, and the common node connection of the resistors R8-R9 is connected to ground. The resistors R8-R9 provide a ground reference for the secondary coil of the transformer TR2. The capacitor C7 is connected between the anode of the diode D6 and the common node connection of the capacitor C5 and the resistor R8. Similarly, the capacitor C8 is connected between the anode of the diode D7 and the common node connection of the capacitor C6 and the resistor R9. The anode of the diode D6 is pulled-up to the supply voltage $V_{CC}$ by the resistor R10, and the anode of the diode D7 is pulled-up to the supply voltage $V_{CC}$ by the resistor R11. The cathodes of the diodes D6-D7 are connected to a node 217 that provides the output of the input sense circuit 215 to the arcing sense circuit 213. The diodes D6-D7 are configured to provide a full wave rectified signal to the arcing sense circuit 213 at the node 217. The capacitors C5-C8 and the resistors R8-R11 within the input sense circuit 215, and the inductance of the secondary coil of the transformer TR2 within the current sensor 205, are operative to perform bandpass filtering of the AC signal provided by the transformer secondary coil. In one embodiment, the values of the components C5-C8 and R8-R11, and the inductance of the transformer secondary coil, are selected to provide a pass band ranging from about 8 kHz to about 100 kHz, or any other suitable pass band.

The arcing sense circuit 213 includes resistors R12-R17, R25, capacitors C9-C10, C13, a diode D15, and a comparator 220. As shown in FIG. 2b, the resistor R12 and the capacitor C9 are connected between the node 217 and ground, and the capacitor C10 and the resistor R14 are connected in series between the node 217 and the non-inverting input of the comparator 220. The resistor R13 is connected between ground and the common node connection of the capacitor C10 and the resistor R14. The resistors R15-R17 are configured to form a voltage divider that provides a threshold voltage to the inverting input of the comparator 220. This threshold voltage is modulated with the full wave rectified line voltage, which is provided by the power supply 206 to the common node connection of the resistors R15-R16 over a line 240 via the resistor R17. In the illustrated embodiment, this threshold voltage is modulated with the full wave rectified line voltage to generate a variable threshold voltage ($V_{CVT}$) that varies continuously with the line voltage. When a significant di/dt event(s) causes the voltage level of the sensed signal provided to the non-inverting input of the comparator 220 via the input resistor R14 to exceed the level of the continuously variable threshold voltage ($V_{CVT}$) at the inverting input of the comparator 220, the output of the comparator 220 is driven to its positive rail, thereby generating a pulse for charging the capacitor C13 through the diode D15 and the resistor R25. The common node connection of the diode D15 and the capacitor C13 is connected to an input of the processing unit 208 (see FIG. 2a), which is operative to take measurements of the voltage level across the capacitor C13, and to analyze the voltage measurements using one or more algorithms to determine whether the detected levels resulted from an arc fault or a nuisance load.

Figure 2C:
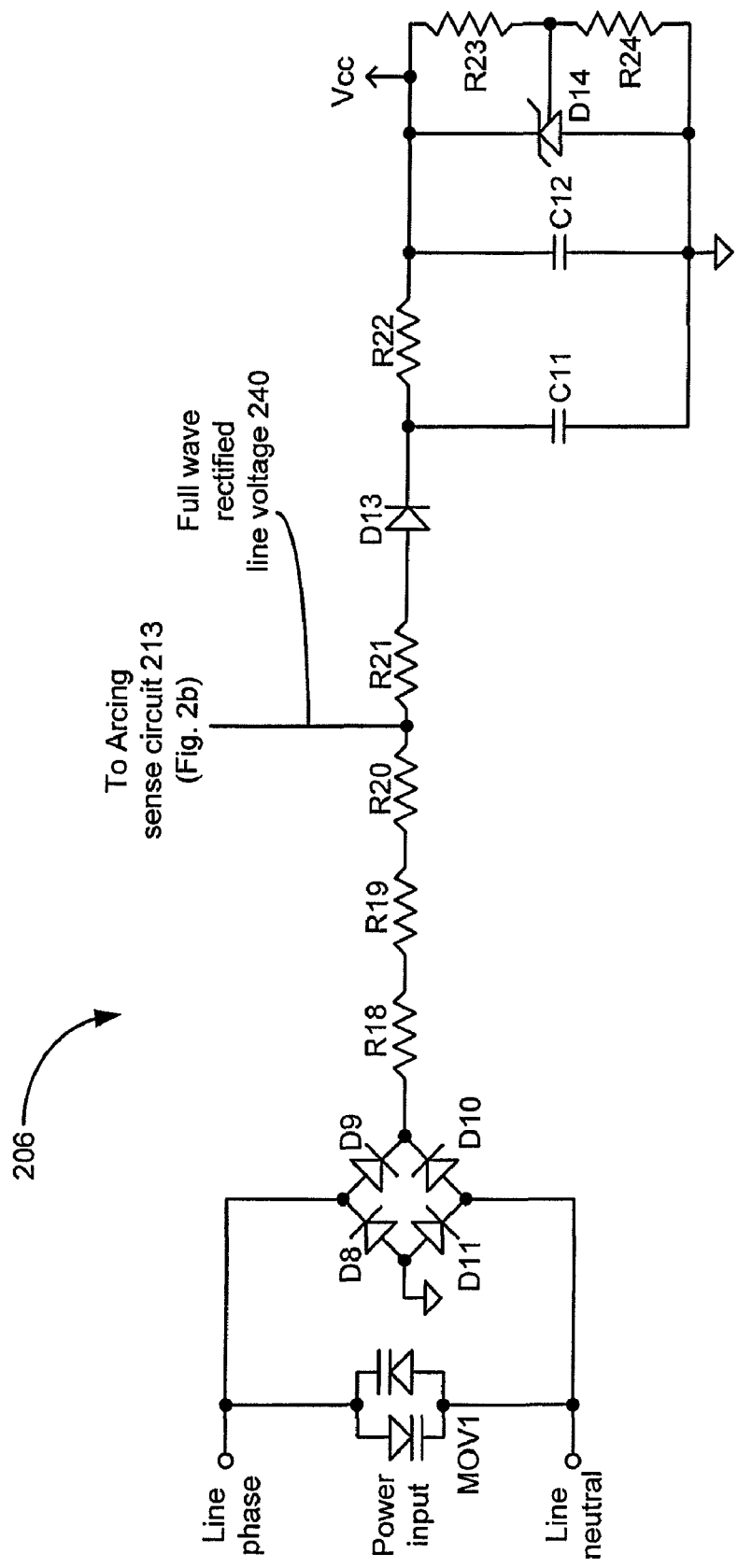

FIG. 2c depicts an illustrative embodiment of the power supply 206. As shown in FIG. 2c, power supply 206 includes resistors R18-R24, capacitors C11-C12, diodes D8-D11 and D13-D14, and a metal oxide varistor (MOV1). The metal oxide varistor (MOV1) is connected between the line phase and line neutral terminals of the power input to prevent excessive line voltage. The diodes D8-D11 are configured to form a full wave rectified bridge operative to convert the power input to a full wave rectified signal. This full wave rectified signal is provided to the serially-connected resistors R18-R21, which limit the amount of current provided to the zener diode D14. The diode D13 prevents reverse current flow from the capacitor C11, which is connected between ground and the common node connection of the diode D13 and the resistor R22. The resistor R22 and the capacitor C12 are operative to perform low pass filtering of the full wave rectified signal, thereby generating the supply voltage $V_{CC}$. As shown in FIG. 2c, the line 240 is connected to the common node connection of the resistors R20-R21 to provide the full wave rectified line voltage to the arcing sense circuit 213 (see also FIG. 2b).

Figure 2D:
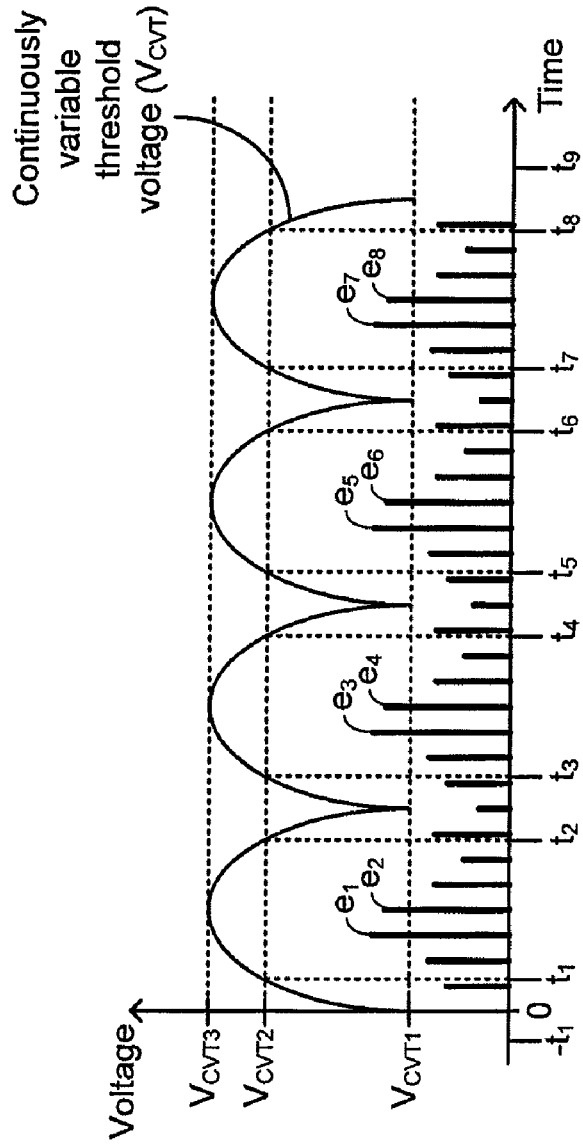
FIG. 2d is a timing diagram illustrating the relationship between the variable threshold voltage employed by the comparator circuit of FIG. 2b, and sudden di/dt events caused by a nuisance load.

FIG. 2d is a timing diagram depicting the relationship between the continuously variable threshold voltage ($V_{CVT}$) employed by the comparator 220, and the sudden di/dt events caused by the nuisance load described above with reference to FIG. 1c. As discussed above with reference to FIG. 2b, the threshold voltage provided by the voltage divider R15-R17 is modulated with the full wave rectified line voltage provided over the line 240 to generate the variable threshold voltage ($V_{CVT}$), which varies continuously with the line voltage. In the illustrated embodiment, the variable threshold voltage ($V_{CVT}$) varies in-phase with the full wave rectified line voltage, and varies continuously within a specified voltage range ranging from $V_{CVT1}$ to $V_{CVT3}$. For example, the supply voltage $V_{CC}$ may be equal to about 3.4 volts or any other suitable voltage level, and the specified voltage range may correspond to a voltage range ranging from about 0.2 volts to about 0.5 volts or any other suitable voltage range. In the illustrated embodiment, the variable threshold voltage ($V_{CVT}$) varies continuously from the voltage level $V_{CVT1}$ at approximately the midpoint of the specified time windows $-t_1$ to $t_1$, $t_2$ to $t_3$, $t_4$ to $t_5$, $t_6$ to $t_7$, and $t_8$ to $t_9$ centered on the zero crossing points of the line voltage to the voltage level $V_{CVT2}$ at each end of the specified time windows, and varies continuously from the voltage level $V_{CVT2}$ at the ends of the specified time windows to the voltage level $V_{CVT3}$ at approximately the midpoint between successive time windows.

As described above with reference to FIG. 1c, the levels of the sudden di/dt events $e_1$-$e_8$ occurring between the time windows $-t_1$ to $t_1$ and $t_2$ to $t_3$, between the time windows $t_2$ to $t_3$ and $t_4$ to $t_5$, between the time windows $t_4$ to $t_5$ and $t_6$ to $t_7$, and between the time windows $t_6$ to $t_7$ and $t_8$ to $t_9$ exceed the level of the constant threshold voltage ($V_{CT}$) employed by the prior arc fault detection apparatus 100. Because the variable threshold voltage ($V_{CVT}$) employed by the arc fault detection apparatus 200 varies in-phase with the full wave rectified line voltage and varies continuously within the specified voltage range ranging from $V_{CVT1}$ to $V_{CVT3}$, as described above, the levels of the sudden di/dt events $e_1$-$e_8$ occurring between these respective time windows are less than the level of the variable threshold voltage ($V_{CVT}$). The levels of these sudden di/dt events are therefore not high enough to cause the output of the comparator 220 to be driven to its positive rail. Accordingly, the likelihood of the processing unit 208 incorrectly characterizing these events $e_1$-$e_8$ as arc faults is effectively eliminated.

Figure 2E:
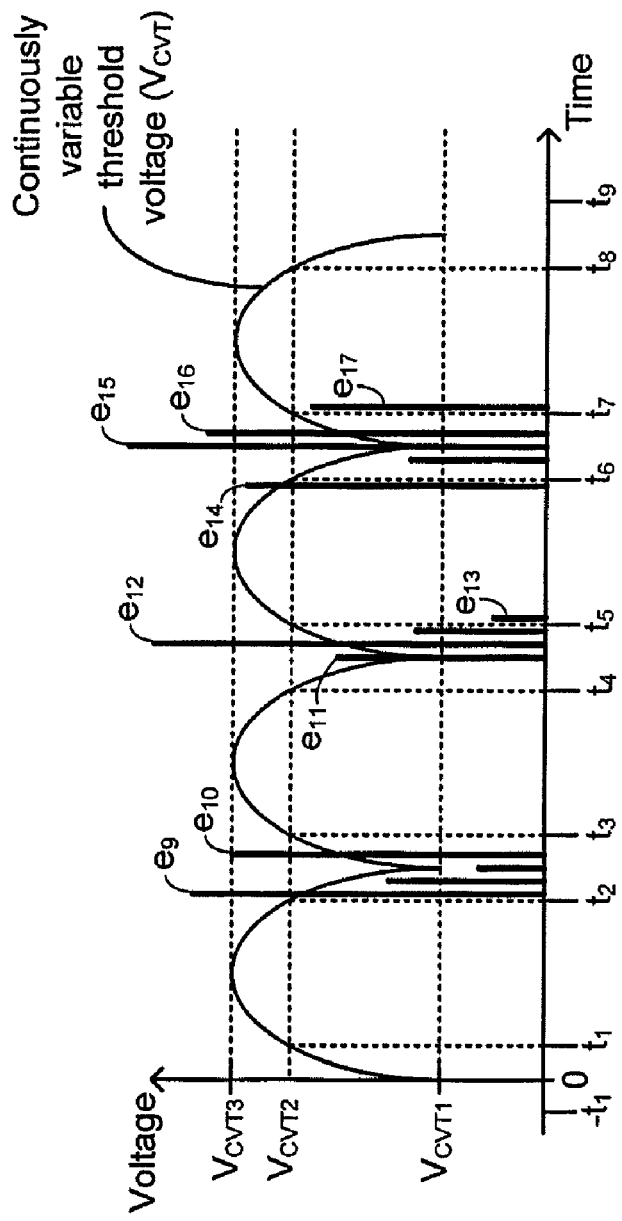
FIG. 2e is a timing diagram illustrating the relationship between the variable threshold voltage employed by the comparator circuit of FIG. 2b, and sudden di/dt events caused by electrical arcing.

FIG. 2e is a timing diagram depicting the relationship between the continuously variable threshold voltage ($V_{CVT}$) employed by the comparator 220, and sudden di/dt events caused by electrical arcing, such as an arc in series with a resistive load. As described above with reference to FIG. 2d, the variable threshold voltage ($V_{CVT}$) varies in-phase with the full wave rectified line voltage, and varies continuously within the specified voltage range ranging from $V_{CVT1}$ to $V_{CVT3}$. Specifically, the variable threshold voltage ($V_{CVT}$) varies continuously from the voltage level $V_{CVT1}$ to the voltage level $V_{CVT2}$ within the specified time windows $-t_1$ to $t_1$, $t_2$ to $t_3$, $t_4$ to $t_5$, $t_6$ to $t_7$, and $t_8$ to $t_9$ centered on the zero crossing points of the line voltage, and varies continuously within the higher voltage range ranging from the voltage level $V_{CVT2}$ to the voltage level $V_{CVT3}$ outside of these specified time windows.

As shown in FIG. 2e, the sudden di/dt events caused by electrical arcing occur within or just outside of the time windows $t_2$ to $t_3$, $t_4$ to $t_5$, and $t_6$ to $t_7$ centered on the corresponding line voltage zero crossing points. For example, the events $e_9$-$e_{10}$ occurring within the time window $t_2$ to $t_3$ exceed the level of the variable threshold voltage ($V_{CVT}$), while the remaining sudden di/dt events occurring within this window $t_2$ to $t_3$ are less than the level of $V_{CVT}$. Further, the events $e_{11}$-$e_{12}$ occurring within the time window $t_4$ to $t_5$ exceed the level of the variable threshold voltage ($V_{CVT}$), while the remaining sudden di/dt event occurring within this window $t_4$ to $t_5$ is less than the level of $V_{CVT}$. Moreover, the events $e_{15}$-$e_{16}$ occurring within the time window $t_6$ to $t_7$ exceed the level of the variable threshold voltage ($V_{CVT}$), while the remaining sudden di/dt event occurring within this window $t_6$ to $t_7$ is less than the level of $V_{CVT}$. Accordingly, the levels of the events $e_9$-$e_{10}$, $e_{11}$-$e_{12}$, and $e_{15}$-$e_{16}$ occurring within the respective time windows are high enough to cause the output of the comparator 220 to be driven to its positive rail, thereby allowing the processing unit 208 to correctly characterize these events $e_9$-$e_{10}$, $e_{11}$-$e_{12}$, and $e_{15}$-$e_{16}$ as arc faults based on the voltage levels provided by the comparator 220.

In addition, the event $e_{14}$ occurring just outside of the time window $t_6$ to $t_7$ exceeds the level of the variable threshold voltage ($V_{CVT}$), while the events $e_{13}$ and $e_{17}$ occurring just outside of the time windows $t_4$ to $t_5$ and $t_6$ to $t_7$, respectively, are less than the level of $V_{CVT}$. The level of the event $e_{14}$ is therefore high enough to cause the output of the comparator 220 to be driven to its positive rail, while the levels of the events $e_{13}$ and $e_{17}$ are not high enough to drive the output of the comparator 220 to its rail. Accordingly, based on the voltage levels provided by the comparator 220, the processing unit 208 will correctly characterize the event $e_{14}$ as an arc fault, and will avoid nuisance tripping in response to the events $e_{13}$ and $e_{17}$. It should be appreciated that the prior arc fault detection apparatus 100 would be susceptible to nuisance tripping in response to the event $e_{17}$, in the case where the constant threshold voltage ($V_{CT}$) is equal to $V_{CVT1}$.

Figure 3:
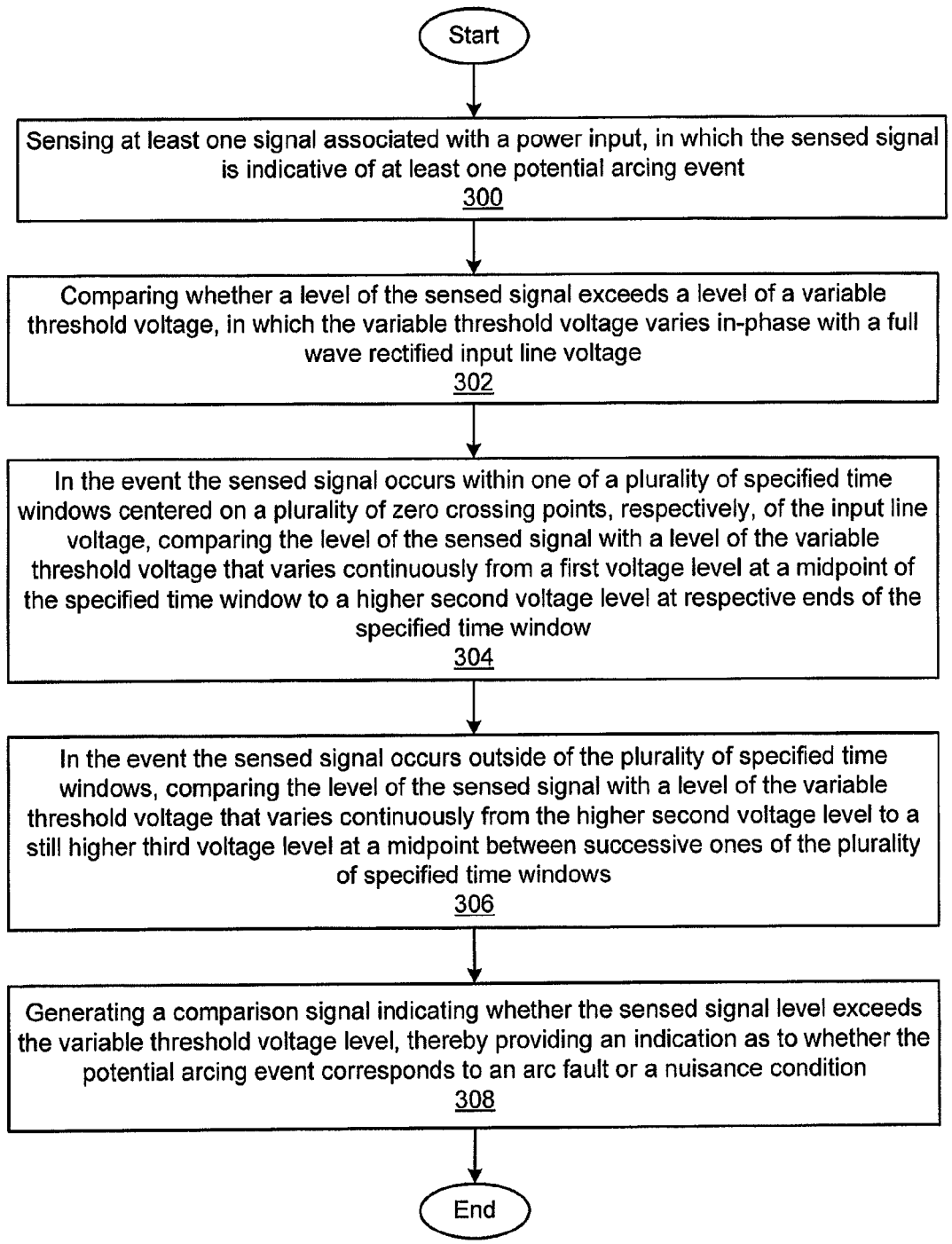

A method of operating the presently disclosed arc fault detection apparatus is described below with reference to FIG. 3. As shown in FIG. 3, the presently disclosed method includes sensing at least one signal associated with a power input, in which the sensed signal is indicative of at least one potential arcing event (see step 300), and comparing whether a level of the sensed signal exceeds a level of a variable threshold voltage, in which the variable threshold voltage varies in-phase with a full wave rectified input line voltage (see step 302). In the event the sensed signal occurs within one of a plurality of specified time windows centered on a plurality of zero crossing points, respectively, of the input line voltage, the level of the sensed signal is compared with a level of the variable threshold voltage that varies continuously from a first voltage level at a midpoint of the specified time window to a higher second voltage level at respective ends of the specified time window (see step 304). In the event the sensed signal occurs outside of the plurality of specified time windows, the level of the sensed signal is compared with a level of the variable threshold voltage that varies continuously from the higher second voltage level to a still higher third voltage level at a midpoint between successive ones of the plurality of specified time windows (see step 306). A comparison signal is then generated indicating whether the sensed signal level exceeds the variable threshold voltage level, thereby providing an indication as to whether the potential arcing event corresponds to an arc fault or a nuisance condition (see step 308).

Having described the above illustrative embodiments, other alternative embodiments or variations may be made. For example, it was described that a significant di/dt event can cause the voltage level of the full wave rectified signal provided to the non-inverting input of the comparator 220 (see FIG. 2b) to exceed the level of the continuously variable threshold voltage ($V_{CVT}$), thereby causing the output of the comparator 220 to be driven to its positive rail. In an alternative embodiment, this comparator circuit may be replaced with an operational amplifier (op amp) circuit configured to produce, in response to such a significant di/dt event(s), one or more voltage levels or pulse widths having corresponding magnitudes proportional to the magnitude of the sudden di/dt event. Further, the processing unit 208 (see FIG. 2b) may be configured to characterize such sudden di/dt events as arc faults or nuisance loads based at least in part on the magnitudes of these voltage levels or pulse widths.

In addition, it was described that the presently disclosed arc fault detection apparatus may be employed to monitor a resistive load for the occurrence of electrical arcing events. In alternative embodiments, the disclosed arc fault detection apparatus may be employed to monitor a capacitive load, an inductive load, or any other suitable type of load, for the occurrence of such arcing events.

It is noted that the presently disclosed arc fault detection apparatus and method may be employed in any suitable digital, analog, or mixed signal environment for detecting and distinguishing between electrical arc faults and nuisance conditions. For example, the presently disclosed apparatus and method may be employed in any suitable residential, commercial, industrial, or military application for detecting and distinguishing between electrical arc faults and nuisance conditions with increase reliability.

It will be appreciated by those of ordinary skill in the art that modifications to and variations of the above-described arc fault detection apparatus employing a continuously variable threshold voltage may be made without departing from the inventive concepts disclosed herein. Accordingly, the invention should not be viewed as limited except as by the scope and spirit of the appended claims.

What is claimed is:

1. Arc fault detection apparatus, comprising:
   a power input;
   an input sense circuit operative to sense at least one signal associated with said power input, the sensed signal being indicative of at least one potential arcing event; and
   an arcing sense circuit including a comparator circuit, said comparator circuit being operative:
   to receive a representation of the sensed signal;

to compare whether a level of the sensed signal exceeds a level of a variable threshold voltage, said variable threshold voltage varying continuously with an input line voltage; and to generate a comparison signal indicating whether the sensed signal level exceeds the variable threshold voltage level based on a result of the comparison, thereby providing an indication as to whether said at least one potential arcing event corresponds to an arc fault or a nuisance condition.

2. The arc fault detection apparatus of claim 1 further including:

a power supply coupled to said power input, said power supply being operative to perform full wave rectification of an input line voltage, and to provide a full wave rectified line voltage, wherein said variable threshold voltage varies in-phase with the full wave rectified line voltage.

3. The arc fault detection apparatus of claim 2 wherein said comparator circuit is further operative, in the event the sensed signal occurs within one of a plurality of specified time windows centered on a plurality of zero crossing points, respectively, of said input line voltage, to compare the level of the sensed signal with a level of said variable threshold voltage that varies continuously from a first voltage level at a midpoint of said one of said plurality of specified time windows to a higher second voltage level at respective ends of said one of said plurality of specified time windows.

4. The arc fault detection apparatus of claim 3 wherein each of said plurality of specified time windows corresponds approximately to a +/− 1 msec time window.

5. The arc fault detection apparatus of claim 3 wherein said comparator circuit is further operative, in the event the sensed signal occurs outside of said plurality of specified time windows, to compare the level of the sensed signal with a level of said variable threshold voltage that varies continuously from said higher second voltage level to a still higher third voltage level at a midpoint between successive ones of said plurality of specified time windows.

6. The arc fault detection apparatus of claim 1 wherein said input sense circuit includes a band-pass filter operative to perform band-pass filtering of the sensed signal.

7. The arc fault detection apparatus of claim 6 wherein said comparator circuit is further operative:

to receive a representation of the band-pass filtered signal;

to compare whether a level of the band-pass filtered signal exceeds a level of said variable threshold voltage; and to generate said comparison signal indicating whether the band-pass filtered signal level exceeds the variable threshold voltage level based on a result of the comparison.

8. The arc fault detection apparatus of claim 6 wherein said band-pass filter is operative to provide a pass band ranging from approximately 8 kHz to 100 kHz.

9. The arc fault detection apparatus of claim 1 wherein said arcing sense circuit is configured and operative to generate one of a voltage level and a voltage pulse width having a magnitude proportional to a magnitude of the sensed signal.

10. A method of detecting an arc fault, comprising the steps of:

sensing at least one signal associated with a power input, the sensed signal being indicative of at least one potential arcing event;

in a comparing step, comparing whether a level of the sensed signal exceeds a level of a variable threshold voltage, said variable threshold voltage varying continuously with an input line voltage; and in a generating step, generating a comparison signal indicating whether the sensed signal level exceeds the variable threshold voltage level based on a result of the comparison, thereby providing an indication as to whether said at least one potential arcing event corresponds to an arc fault or a nuisance condition.

11. The method of claim 10 further including performing full wave rectification of an input line voltage, and providing a full wave rectified line voltage, wherein said variable threshold voltage varies in-phase with the full wave rectified line voltage.

12. The method of claim 11 further including, in the event the sensed signal occurs within one of a plurality of specified time windows centered on a plurality of zero crossing points, respectively, of said input line voltage, comparing the level of the sensed signal with a level of said variable threshold voltage that varies continuously from a first voltage level at a midpoint of said one of said plurality of specified time windows to a higher second voltage level at respective ends of said one of said plurality of specified time windows.

13. The method of claim 12 further including, in the event the sensed signal occurs outside of said plurality of specified time windows, comparing the level of the sensed signal with a level of said variable threshold voltage that varies continuously from said higher second voltage level to a still higher third voltage level at a midpoint between successive ones of said plurality of specified time windows.

14. The method of claim 10 further including, in a performing step, performing band-pass filtering of the sensed signal.

15. The method of claim 14 wherein said comparing step includes comparing whether a level of the band-pass filtered signal exceeds a level of said variable threshold voltage, and wherein said generating step includes generating said comparison signal indicating whether the band-pass filtered signal level exceeds the variable threshold voltage level based on a result of the comparison.

16. The method of claim 14 wherein said performing step includes providing a pass band ranging from approximately 8 kHz to 100 kHz.

17. The arc fault detection circuit of claim 6 in which the input sense circuit further includes forward biased diodes to reduce the threshold voltage of the forward biased diodes thereby allowing more of the sensed signal to reach arc sensing circuit and current limiting resistors to minimize the effect of temperature variation on the sensed signal.

* * * * *